United States Patent [19]

Klausz

[11] Patent Number: 4,852,002

[45] Date of Patent: Jul. 25, 1989

[54] METHOD FOR ADJUSTING THE GRAY SCALE IN THE REPRODUCTION OF DIGITIZED IMAGES AND A SYSTEM FOR CARRYING OUT SAID METHOD

[75] Inventor: Remy Klausz, Neuilly sur Seine, France

[73] Assignee: Thomson-CGR, Paris, France

[21] Appl. No.: 858,766

[22] Filed: May 2, 1986

[30] Foreign Application Priority Data

May 10, 1985 [FR] France .................... 85 07150

[51] Int. Cl.$^4$ ............................ H04N 5/14
[52] U.S. Cl. ................ 364/413.13; 358/169; 364/413.22
[58] Field of Search ........... 364/414, 413.13, 413.22; 358/96, 111, 169, 168; 378/99

[56] References Cited

U.S. PATENT DOCUMENTS

| Re. 32,164 | 5/1986 | Kruger | 378/19 |
|---|---|---|---|
| 4,229,764 | 10/1980 | Danos | 358/96 |
| 4,236,128 | 11/1980 | Tiemeijer | 358/169 |
| 4,445,138 | 4/1984 | Zwirn et al. | 358/169 |
| 4,506,292 | 3/1985 | Newton et al. | 358/169 |
| 4,595,949 | 6/1986 | Fenster et al. | 358/111 |
| 4,674,108 | 6/1987 | Asahina et al. | 378/99 |

FOREIGN PATENT DOCUMENTS 2129635  5/1984  United Kingdom .

OTHER PUBLICATIONS

Troxel et al., "Interactive Enhancement of Tone Scale," Optical Engineering, vol. 21, No. 5, Sep./Oct., 1982, pp. 841-846.

*Primary Examiner*—Jerry Smith
*Assistant Examiner*—Kim Thanh Tbui
*Attorney, Agent, or Firm*—Pollock, VandeSande & Priddy

[57] ABSTRACT

In a method for interactive adjustment of the parameters of a gray-scale window in a system for reproduction of a digitized image such as an x-ray image, one of the parameters designated as the mean-level parameter is modified at the instant of each elementary control action by a computed value of the other parameter designated as the width parameter.

7 Claims, 1 Drawing Sheet

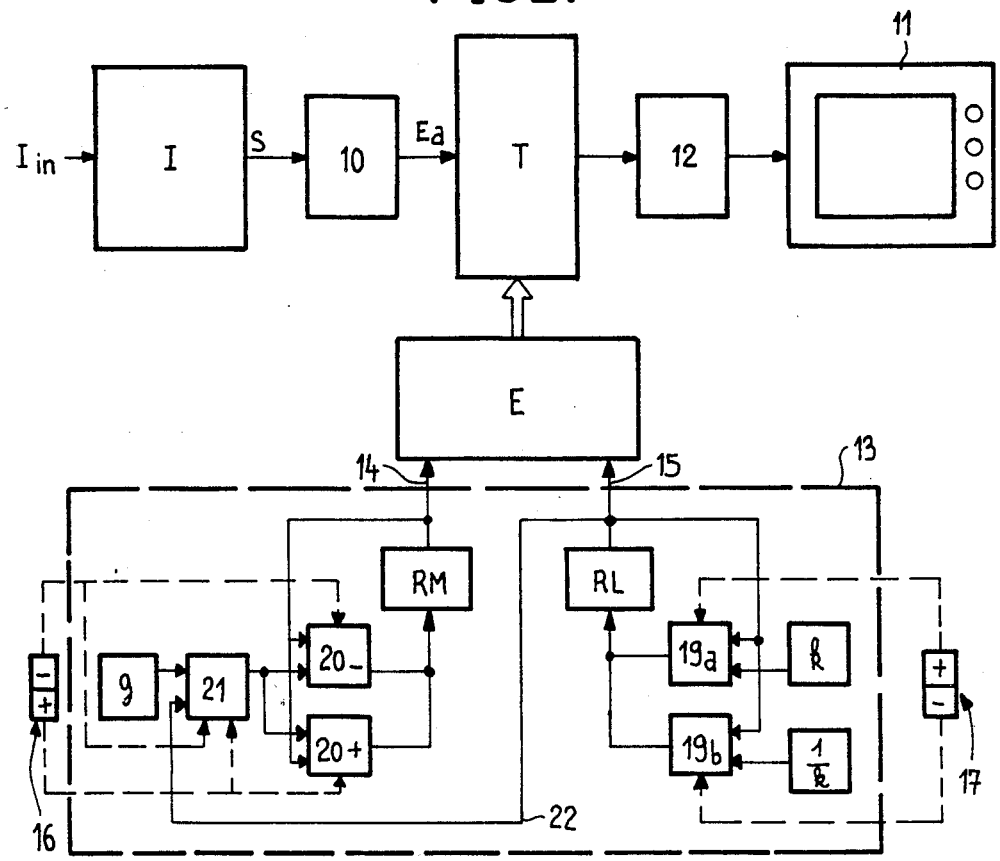
FIG_1
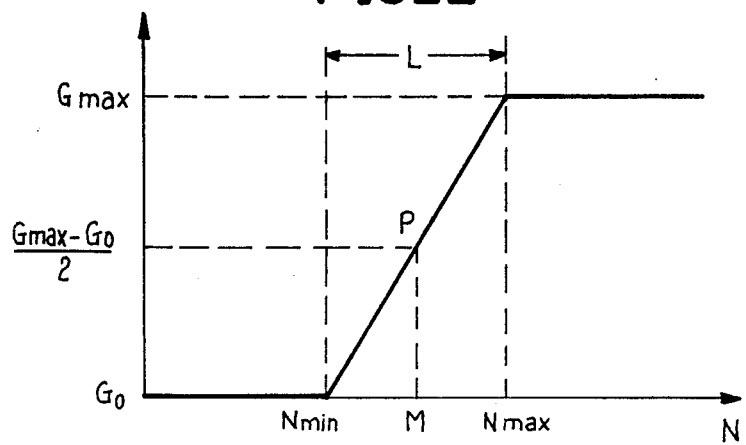
FIG_2

METHOD FOR ADJUSTING THE GRAY SCALE IN THE REPRODUCTION OF DIGITIZED IMAGES AND A SYSTEM FOR CARRYING OUT SAID METHOD

BACKGROUND OF THE INVENTION

1. Field of the Invention

The present invention relates to a method for adjusting the gray scale in the reproduction of digitized images and particularly x-ray images in which it is desirable to visualize digital data which are representative of the image through a "window" having characteristics determined by the user. The invention is more specifically concerned with determination of the parameters of the window mentioned. The invention also relates to a system for processing digitized images and carrying out said method.

2. Description of the Prior Art

In digital radiology systems in which acquired images are transmitted and processed in digital form, pixel by pixel, the dynamic range of the acquisition means is appreciably greater than the capacity of the human eye to distinguish two adjacent gray levels. In other words, only a limited number of gray tones can be made to correspond to a large number of possible acquired digital values. Moreover, in the case of a given x-ray examination, only a fraction of the data contained in the digitized image is useful for examination purposes. By way of example, this fraction corresponds to a predetermined zone of absorption of x-rays by the structures to be observed. In this field of interest, it is a known practice to visualize the image by means of a "window". This method of display consists of making the entire scale of gray levels correspond to the useful range of digital values for the examination in progress. In other words, all of the values lower than or higher than this range are represented without distinction respectively by black or by white (or conversely) while the useful range of numerical values of the image is reproduced by all of the discernible shades (tones) of gray. The law of correspondence between the numerical values of the selected range and the shades of gray may be as desired but is usually linear. It will be apparent that, depending on the type of examination to be performed, the radiologist has to adjust the characteristics of the "window", or in other words to determine the limits of the range of numerical values which he desires to visualize. In the great majority of instances, these adjustments are performed by hand while the appearance of the image after "window processing" is continuously monitored on a television screen, for example. A usual practice consists, for example, in characterizing the window by two parameters which are referred to as a meanlevel parameter and a width parameter. The width of the window represents the number of numerical values which will actually be transcribed in shades of gray. This parameter is therefore representative of the contrast which will be greater as the width of the window is smaller. The mean level is given by the numerical value of the acquired image with which the mean shade of the gray scale is associated. This mean level is therefore chosen as a function of the nature of the structures to be examined. The user makes very frequent changes in these two parameters in order to subject the contents of the image to an exhaustive examination. Visual display installations are therefore equipped with means for controlling the variation of these two parameters. Control installations are provided on a front face with actuating elements such as push-buttons or rotatable knobs associated with pulse-generating circuits. Each generated pulse is processed by the electronic control system for the purpose of modifying the width or the mean level by a predetermined value. This elementary variation is difficult to determine. In fact, in the case of a substantial width, or in other words a low contrast, only a substantial variation in mean level is significant. On the other hand, in the case of a small width (high contrast), a minimum variation in mean level has consequences which are very clearly visible on the monitoring screen. In other words, in the case of a given choice of elementary variation in parameters which constitutes a compromise between the two extreme situations described above, the user may have the disagreeable impression of wasting his time by actuating the mean-level control knobs when the contrast is low since the resulting modifications of the image are insignificant. In the case of a high contrast, however, the same elementary variation in mean level will result in excessive modifications of the image. Thus there is a potential danger of preventing display of an intermediate configuration which might reveal clinically significant details. Up until the present time, some effort has been made to overcome this problem by providing several sets of keys for selecting a certain number of values of elementary variation but the resulting increase in the number of control elements also increases the risks of confusion and errors of operation since the user's attention is continually drawn to the monitor display screen and not to the control elements.

The present invention, however, makes it possible to solve the problem just described by reducing to a strict minimum the number of actuating elements required for adjusting the window.

SUMMARY OF THE INVENTION

With this objective in mind, the invention is essentially concerned with a method for adjusting the gray scale in the reproduction of a digitized image such as an x-ray image, for example. In particular, the reproduction operation comprises the step as transposing the numerical values representing pixels of the image across a gray window defined by two modifiable parameters. The distinctive feature of the invention lies in the fact that the effective variation of a first parameter is a function of the value of the second parameter, this latter being representative of the contrast.

Preferably, the parameters are modifiable by means of a succession of elementary control actions. In this case, the aforementioned variation of the first parameter as a function of the value of the second parameter takes place at the time of each elementary control action on the first parameter.

In the case described above in which the window is characterized by its mean level and its width, said first parameter is the mean level while the second parameter is the width. In the majority of instances, said second parameter will have an autonomous variation in accordance with a predetermined law which is independent of another parameter. A logarithmic variation will preferably be associated with said second parameter.

The invention is also concerned with a digitized-image processing system comprising a table of equivalence of gray levels or the like, said table being interposed between means for reading an image memory and a digital-to-analog converter and writing means for modifying the contents of said table of equivalence. In accordance with one distinctive feature, the digitized-image processing system comprises computing means connected for controlling said writing means on the basis of two parameters defined by respective determination circuits, said circuits being controlled by respective variation-control means. In accordance with another distinctive feature, the circuit for determination of a first parameter comprises an operator coupled to the output of the circuit for determination of the second parameter.

BRIEF DESCRIPTION OF THE DRAWINGS

Other features of the invention will become more apparent upon consideration of the following description and accompanying drawings, wherein :

FIG. 1 is a block diagram of part of a digitized-image display installation in accordance with the invention;

FIG. 2 is a graph illustrating the gray-scale window process to which the image has to be subjected prior to reproduction.

DETAILED DESCRIPTION OF THE INVENTION

Referring to the drawings, there is shown an image memory I, the input I in of which is connected to means provided for digital acquisition of an image, in this case in an x-ray installation. The output S of said memory is connected to reading means 10 arranged so as to address the values read from the memory to a gray equivalence table T, the output of which is connected to visual display means such as, for example, a television monitor 11 via a digital-to-analog converter 12. The numerical values contained in the memory I are representative of the pixels of the image and arrive in the form of addresses at the addressing input Ea of the table of equivalence T. Consequently, the contents of this table perform the gray-window processing operation in accordance with FIG. 2. The table T is associated with writing means E which are adapted to load all of its values in a very short period of time of the order of the frame retrace time of the television monitor 11. These writing means comprise means for plotting the curve of FIG. 2, provided that they are supplied with two parameters, namely a first parameter designated as a mean-level parameter and a second parameter designated as a width parameter. The arrangement described thus far is in accordance with standard practice and may therefore be readily understood by anyone versed in the art. Operation of the writing means E is therefore initiated by computing means 13, the values of the two aforementioned parameters being delivered as data by said computing means to said writing means. To this end, the writing means are provided with two inputs, namely an input 14 to which the mean-level parameter is applied and an input 15 to which the width parameter is applied. In this example, the invention applies more particularly to the structure of the means 13 employed for computing the two parameters.

Referring more particularly to the graph of FIG. 2, the possible levels N of the digitized image as they are in fact stored in the memory I have been plotted as abscissae and the possible values of the gray scale which vary between a minimum value $G_o$ and a maximum value $G_{max}$ have been plotted as ordinates, these values being the extreme values applied to the digital-to-analog converter 12. The mean level M is therefore defined as the numerical value of the image memory I which is plotted as abscissae and to which a gray tone plotted as ordinates $(G_{max}-G_o)/2$ is made to correspond to the table T. Any modification of the mean level is therefore represented by a displacement of the point P along the axis of abscissae. Moreover, the width L is represented by the interval occupied along the axis of abscissae by the linear portion of the curve, that is to say $N_{max}-N_{min}$. The function of the writing means is therefore to transcribe the curve of FIG. 2 in the table T in order to ensure that a possible value defined by the gray-window processing operation corresponds to each possible numerical value of the image memory I. Thus all of the values of the memory I within the range of 0 to $N_{min}$ will be indiscernible on the screen of the television monitor 11 and will be reproduced in black, for example; all of the values of the memory I which are higher than $N_{max}$ will also be indiscernible and reproduced in white, for example, while a predetermined shade of gray will be associated with the numerical values comprised between $N_{min}$ and $N_{max}$.

Referring again to FIG. 1, the computing means 13 which has the allotted task of updating the values of M and L as a function of the operations performed by the operator is controlled by two pairs of keys having the signs + and − and designated respectively by the reference 16 in the case of the pair used for modifying the mean value M and by the reference 17 in the case of the pair used for modifying the width L. These pairs of keys are therefore associated with two separate and distinct circuits for determining parameters, one circuit being provided for determining the first parameter, or so-called mean-value parameter, and the other circuit being provided for determining the second parameter, or so-called width parameter. The values of these two parameters are respectively updated in two registers RM and RL which are periodically "consulted" by the writing means E in order to prepare loading of the values of the table T. It will be assumed by way of example that the keys 16 and 17 are associated with pulse-generating circuits (not shown), each pulse being recorded by the computing means 13 as an order for incrementation or decrementation of the corresponding parameter L or M. All of the components of the computing circuit 13 are circuits which have the function of performing simple operations such as additions, subtractions or multiplications. Those versed in the art can readily conceive or obtain sub-assemblies of this type. In accordance with an advantageous feature of the invention, the law of progression of the width L (as a function of the number of pulses delivered by one of the keys 17) is logarithmic. This means that any new value of L is the product of multiplication of the old value by a constant factor k (k being a relative number larger than 1) if it is desired to increase the width or by 1/k if it is desired to reduce said width. In consequence, each key 17+, 17− is connected to a control input of a multiplier 19a, 19b respectively. A data input of each multiplier is connected to the output of the register RL while the other data input is connected to another register forming a memory which contains the factor k or 1/k respectively. The outputs of the two multipliers are connected to the input of the register RL. All of these components form the circuit for determining the second parameter aforesaid.

Moreover, the keys 16— and 16+ are connected to control inputs of a subtractor 20— for by 16— and an adder 20+ for key 16+. A data input of each adder or subtracter is connected to the output of the register RM while its other data input is connected to the output of a multiplier 21. A data input of said multiplier which constitutes the operator mentioned above is connected to a register forming a memory which contains a predetermined factor g while its other data input is connected to the output of the register RL via a line 22. The arrangement of the multiplier 21, of the register g and of the connecting line 22 is specific to the invention since it forms the product g.L each time a key 16+ or 16— is actuated. This product is then added or subtracted from the previous value of the mean level M by the adder 20+ or the subtracter 20—, depending on whether the key 16+ or 16— has been depressed by the operator. All of these components form the circuit for determination of the first parameter aforesaid.

The operation of the system which has just been described is simple and is clearly apparent from the foregoing description. In a practical form of construction, the factor g can be of the order of ⅛ while the value chosen for the factor k can be within the range of 1.25 to 1.30 although these values do not imply any limitation. As will readily be understood, the example of construction described in the foregoing with reference to FIG. 1 can include many alternative forms and the invention is not limited to a design comprising fully wired connections. In particular, the operations performed by the computing circuit 13 and the writing means E can be either partly or wholly transcribed in a program. In short, the invention is not limited to the example hereinabove described but includes all equivalent means within the purview of the appended claims.

What is claimed is:

1. A method for adjusting gray scale in reproduction of a digitized image such as an x-ray image wherein said reproduction comprises:
   transposing numerical values representing pixels of the image across a gray window defined by
   a mean level parameter and a window-width parameter, each parameter having a single value at any one time,
   wherein for said transposing the value of the
   mean level parameter is controlled as a function of the value of the window-width parameter.

2. A method as recited in claim 1 wherein:
   the mean level and window-width parameters are varied by a succession of elementary control actions, and wherein the control of the value of the mean level parameter as a function of the value of the window-width parameter occurs at the time of each elementary control action.

3. A method as recited in claim 2 wherein an elementary control action to control the value of the
   mean level parameter from an old to a new value comprises:
   adding to or subtracting from the old value of the
   mean level parameter a quantity which is proportional to that value of the window-width parameter in effect at the time of the elementary control action, where said proportion has a proportionality factor which is constant.

4. A method as recited in claim 2 wherein an elementary control action to control the value of the
   window-width parameter from an old value to a new value comprises:
   deriving said new value as a product of the old value and a predetermined coefficient.

5. A method as recited in claim 4 wherein said predetermined coefficient is a one of two coefficients depending on whether said new value is larger or smaller than said old value and wherein one of the two coefficients is a reciprocal of another of the coefficients.

6. A method as recited in claim 1 wherein the mean level parameter is an image gray level and the
   window-width parameter is gray window width.

7. A digitized-image processing system comprising a table of equivalence of gray levels or the like, said table being interposed between means for reading an image memory and a digital-to-analog converter, writing means for modifying the contents of said table of equivalence, wherein said system comprises:
   first determination means for determining a mean gray level,
   second determination means for determining a gray window width,
   said system further comprising computing means connected and to controlling said writing means on the basis of a mean gray level and gray window width defined by said first and second determination means, said first and second determination means controlled by respective variation-control means and wherein said first determination means comprises an operator coupled to an output of said second determination means.

* * * * *